(No Model.)
J. H. JAMES & C. D. BARROWS.
AUTOMATIC CUT-OFF FOR MAGIC LANTERNS.
No. 593,069. Patented Nov. 2, 1897.
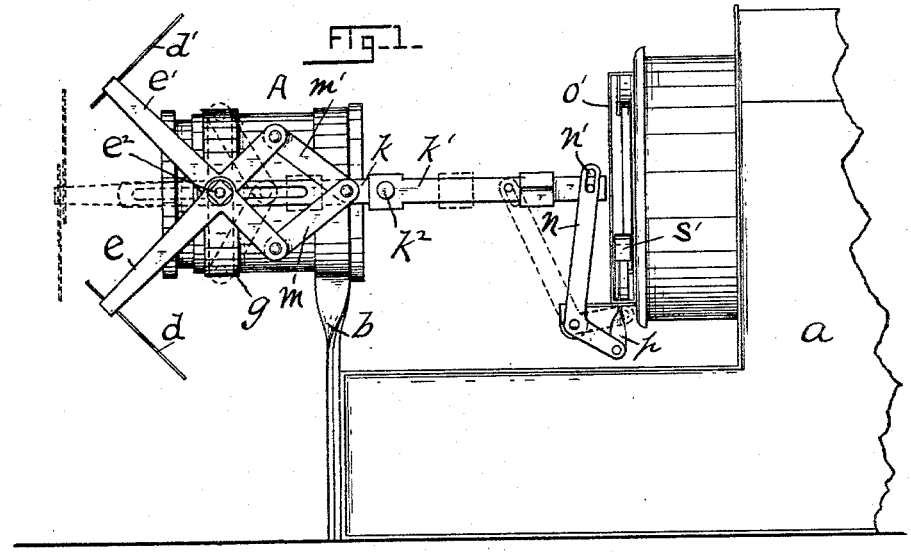
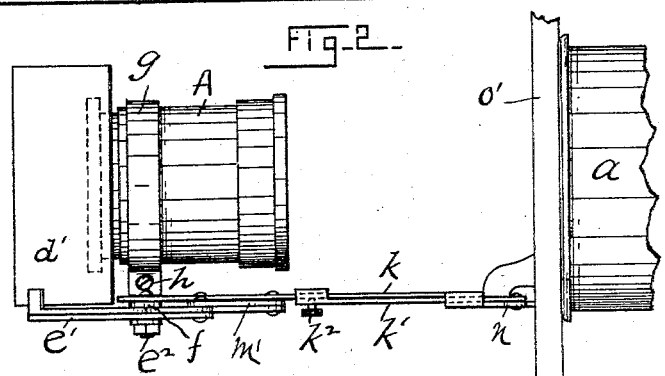
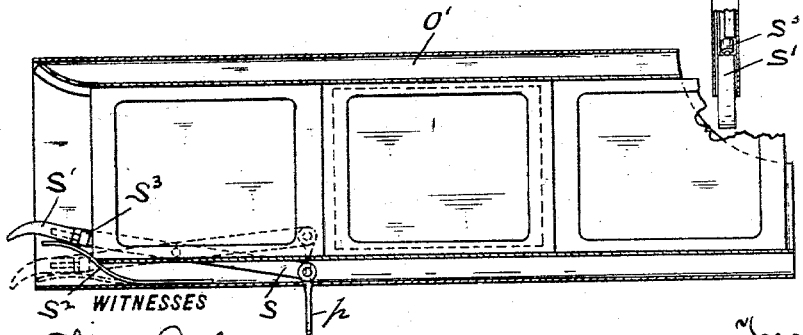
WITNESSES
INVENTORS,
Joseph H. James,
Charles D. Barrows,
BY Frank H. Allen,
ATTORNEY.

UNITED STATES PATENT OFFICE.

JOSEPH H. JAMES, OF ROCKVILLE, AND CHARLES D. BARROWS, OF GLASTONBURY, CONNECTICUT; SAID BARROWS ASSIGNOR TO SAID JAMES.

AUTOMATIC CUT-OFF FOR MAGIC LANTERNS.

SPECIFICATION forming part of Letters Patent No. 593,069, dated November 2, 1897.

Application filed February 27, 1897. Serial No. 625,409. (No model.)

*To all whom it may concern:*

Be it known that we, JOSEPH H. JAMES, residing at Rockville, Tolland county, and CHARLES D. BARROWS, residing at Glastonbury, Hartford county, Connecticut, citizens of the United States, have invented certain new and useful Improvements in Automatic Cut-Offs for Magic Lanterns, which improvements are fully set forth and described in the following specification, reference being had to the accompanying drawings.

The object of our automatic "cut-off" is to conceal from an audience the process of entering, changing, or removing the slides of a magic lantern or sciopticon, thus giving to a single lantern a satisfactory "dissolving" effect similar to that usually obtained by means of two or more lanterns. This desirable result is effected by means of a veil or shutter preferably of semiopaque material like translucent celluloid roughened to resemble "ground glass." This curtain or shutter (which we have here shown as of two parts) is suspended from or supported upon an arm or arms in front of the objective lens of the instrument—that is to say, between the lens and the screen. The said translucent shutter covers the lens at all times except when the said arms are acted upon by the slide or some attachment thereto, thus uncovering the lens as the slide comes into proper register with the screen and covering it again as the slide is about to be removed or changed.

In order to clearly explain our invention, we have provided herewith a sheet of drawings, in which—

Figure 1 is a side view of a sciopticon or a portion thereof having our improvement in what we consider our preferred form. Fig. 2 is a plan view of the shutter and the parts that operate the same. Fig. 3 is a view of the slide-carrier detached from the lantern, said carrier being shown partly in section to disclose the mechanism which, coacting with the slide, controls the opening and closing of said shutter. Fig. 4 is a detail view illustrating the means provided for attaching the shutter-operating lever to the trigger in the slide-carrier.

The said cut-off may be designed for use with lanterns or sciopticons that receive the slides from the top, or it is equally available for use with lanterns that receive the slides at one side of the complete instrument.

In the drawings the letter $a$ denotes a sciopticon-body or combustion-chamber in which the light is located, and $b$ indicates an adjustable front, usually of hood form, in which the objective lens is mounted. Between the rear of the hood $b$ and the front of the condensing-lens the slides or transparent pictures are entered. For convenience in entering and removing the slides some simple form of guideway is usually provided, in which the slides are entered one at a time. After the view has been shown upon the screen it is either withdrawn or passed on through said guideway.

Our improvement consists of a semiopaque curtain or shutter that is suspended between the objective lens and the screen and is of a size sufficient to cover or rather shield the front of said objective. As here illustrated, the shutter is formed of two companion half-sections $d\ d'$, each of which is secured to the free end of an angle-arm or lever $e\ e'$, and said levers are hinged together by a fulcrum pin or rivet $e^2$, that projects from a bracket $f$, which latter is fastened by any suitable clamping device to the objective lens A. The means here shown for clamping said bracket in position consists of a strap $g$, that encircles the lens-tube, the ends of said strap being bent outward, and between said bent portions the bracket $f$ is inserted and secured by means of a binding-screw $h$. The levers $d\ d'$ are thus supported in such manner that their free ends carrying the two-part shutter may approach each other to close the shutter or separate to open said shutter.

The letters $k\ k'$ indicate a bar or rod that is made of two sections secured together in such manner that they may be slid upon each other to lengthen or shorten the complete bar, and when the desired adjustment has been reached they are clamped together by means of a binding-screw $k^2$. This adjustment is necessary in many instances, as the distance from the focal center of the objective lens to the slide varies in different lanterns, and it is our purpose to adapt our new device for use with all sizes and kinds of lanterns.

The front end of the compound rod $k\,k'$ is slotted and straddles the pivot or stud $e^2$, already described. The rod is thus fitted to slide longitudinally on said stud, the latter serving as a guide for the rod. Pivoted to said sliding bar are short bars or rods $m\,m'$, that serve to connect said bar with the free ends of the shorter arms of the shutter-supporting levers $e\,e'$.

When the bar $k\,k'$ is slid rearward longitudinally, the bars $m\,m'$ act to spread or separate the ends that carry the shutter-sections, as in Fig. 1. When, on the other hand, the bar $k\,k'$ is slid forward, (away from the slide-carrier,) the shutter-sections are brought together.

One end of a lever $n$ is connected to the rear end of the section $k'$, and the other end of said lever is slotted, as at $n'$, and pivotally connected by a link $p$ to the inner end of a lever-arm $s$, that is fulcrumed to the slide-carrier $o'$ and extends in a direction parallel with said carrier. Lever-arm $s$ has secured to its outer end a plate portion $s'$, that is located at the entrance to the slide-carrier, as best seen in Fig. 3, and said plate portion is forced upward (when there is no slide in the carrier) by a suitable spring $s^2$. When said plate portion is thus elevated, the opposite end of the lever-arm $s$ is depressed, and through the described link $p$, crank-lever $n$, and rod $k\,k'$ the shutter-supporting arms are moved to separate the two shutter-sections $d\,d'$ and thus allow the field on the screen to be illuminated.

When it is desired to change the picture, the entrance of a new slide in the carrier $o'$ acts immediately to force the plate $s'$ downward, thus raising the opposite end of lever $s$ and resulting in swinging the shutter-sections $d\,d'$ together and shutting off the direct rays of light from the screen. The slide continues to press the plate $s^2$ down (to keep the shutter closed) until such time as the said slide has either passed to the proper position between the condensing and objective lenses or, as here shown, until a slide previously entered in the carrier has been pushed into position for exhibiting. Just at that instant the rear end of the slide last entered passes beyond the plate $s'$, which is immediately forced upward by spring $s^2$, and the shutter-sections $d\,d'$ fly open.

Inasmuch as slides vary somewhat in length (for example, English-made slides are slightly shorter than American slides) we have attached to the inner end of plate $s'$ an adjustable screw $s^3$ to compensate for such variation of length. When short slides are to be used, the said screw is partly unscrewed, thus forming in effect an extension of plate $s'$, and when long slides are to be used the said screw is screwed home against the plate.

The movements of the shutter in closing and opening are performed quietly, rapidly, and automatically, and we find in practice that the effect is quite as pleasing as the more complex and expensive method of employing two lanterns and dissolving devices.

We have shown our device here in its simplest form of construction and as applied to one side of the lantern; but it could as well be mounted on the top of the lantern or at the opposite side from that here illustrated.

Having thus described our invention, we claim—

1. In combination with a magic lantern and screen, a semiopaque shutter interposed between the objective lens and screen, and shutter-operating mechanism, located in part in the path of the slide, for automatically actuating the shutter, all substantially as specified.

2. In combination with a magic lantern and screen, a two-part semiopaque shutter, and supports for the same consisting of oppositely-bent levers that are hinged together, as set forth, and connections, located in part in the path of the slides, for actuating said levers to open and close the shutter; all substantially as specified.

JOSEPH H. JAMES.
CHARLES D. BARROWS.

Witnesses:
FRED. H. L. HAMMOND,
L. W. ALLEN.